US011769014B2

(12) United States Patent
Freed et al.

(10) Patent No.: US 11,769,014 B2
(45) Date of Patent: *Sep. 26, 2023

(54) CLASSIFYING DIGITAL DOCUMENTS IN MULTI-DOCUMENT TRANSACTIONS BASED ON SIGNATORY ROLE ANALYSIS

(71) Applicant: INTERNATIONAL BUSINESS MACHINES CORPORATION, Armonk, NY (US)

(72) Inventors: Andrew R. Freed, Cary, NC (US); Corville O. Allen, Morrisville, NC (US)

(73) Assignee: International Business Machines Corporation, Armonk, NY (US)

( * ) Notice: Subject to any disclaimer, the term of this patent is extended or adjusted under 35 U.S.C. 154(b) by 273 days.

This patent is subject to a terminal disclaimer.

(21) Appl. No.: 17/166,359

(22) Filed: Feb. 3, 2021

(65) Prior Publication Data

US 2021/0158015 A1 May 27, 2021

Related U.S. Application Data

(63) Continuation of application No. 16/167,500, filed on Oct. 22, 2018, now Pat. No. 11,003,889.

(51) Int. Cl.
*G06F 40/30* (2020.01)
*G06F 16/31* (2019.01)
(Continued)

(52) U.S. Cl.
CPC ............ *G06F 40/30* (2020.01); *G06F 16/313* (2019.01); *G06F 16/353* (2019.01); *G06F 40/10* (2020.01);
(Continued)

(58) Field of Classification Search
CPC .. G06K 9/2054; G06K 9/2063; G06K 9/2072; G06K 9/00154; G06F 40/295
(Continued)

(56) References Cited

U.S. PATENT DOCUMENTS 6,094,653 A 7/2000 Li et al.
6,442,555 B1 8/2002 Shmueli et al.
(Continued)

FOREIGN PATENT DOCUMENTS

WO 2015125088 8/2015

OTHER PUBLICATIONS

Daniel Isemann, Tim Fernando, and Khurshid Ahmad, "Time Dependent Information and Ontological Analysis," Nov. 2012, retrieved from Internet <https://www.researchgate.net/profile/Khurshid_Ahmad/publication/260590076_Time_Dependent_Information_and_Ontological_Analysis/data/0f317531a07b48be58000000/Report-81-Time-Dependent-Information-and-Ontological-Analysis.pdf>, 10 pages.
(Continued)

*Primary Examiner* — Vikkram Bali
(74) *Attorney, Agent, or Firm* — David B. Woycechowsky

(57) ABSTRACT

A classifier receives a digital scan of a document and converts the content of the document in the digital scan from an image into text. The classifier analyzes the text to determine one or more predicted roles of one or more signatories, each predicted role determined based on one or more signature elements in the content of the document executed by the one or more signatories. The classifier evaluates each of the one or more predicted roles in view of a plurality of expected signatory role characteristics of a plurality of categories of documents of a transaction to select a particular category associated with the document from among the plurality of categories. The classifier classifies the document within the transaction as a particular logical type
(Continued)

identified by the particular category from among a plurality of logical types for the transaction.

15 Claims, 8 Drawing Sheets

(51) Int. Cl.

| | | |
|---|---|---|
| *G06F 16/35* | (2019.01) | |
| *G06F 40/10* | (2020.01) | |
| *G06F 40/295* | (2020.01) | |
| *G06V 40/30* | (2022.01) | |
| *G06V 30/412* | (2022.01) | |
| *G06V 30/262* | (2022.01) | |
| *G06V 10/22* | (2022.01) | |
| *G06V 30/413* | (2022.01) | |

(52) U.S. Cl.
CPC .......... *G06F 40/295* (2020.01); *G06V 10/225* (2022.01); *G06V 30/274* (2022.01); *G06V 30/412* (2022.01); *G06V 30/413* (2022.01); *G06V 40/30* (2022.01); *G06V 40/33* (2022.01)

(58) Field of Classification Search
USPC ......... 382/173–180, 182, 187, 100–101, 321
See application file for complete search history.

(56) References Cited

U.S. PATENT DOCUMENTS

| | | | |
|---|---|---|---|
| 7,346,839 B2 | 3/2008 | Acharya et al. | |
| 7,840,572 B2 | 11/2010 | Cutts et al. | |
| 7,917,492 B2 | 3/2011 | Bargeron et al. | |
| 8,650,038 B2 | 2/2014 | Peirson et al. | |
| 9,171,070 B2 | 10/2015 | Alspector et al. | |
| 9,542,374 B1 | 1/2017 | Barr et al. | |
| 9,575,622 B1 | 2/2017 | Allison et al. | |
| 9,626,653 B2 | 4/2017 | Saxena et al. | |
| 9,710,540 B2 | 7/2017 | Lu et al. | |
| 9,842,201 B2 | 12/2017 | Follis et al. | |
| 9,853,818 B2 | 12/2017 | Oswalt | |
| 2006/0149643 A1 | 7/2006 | Reiner et al. | |
| 2006/0190489 A1* | 8/2006 | Vohariwatt | G06Q 10/00 |
| 2007/0118391 A1 | 5/2007 | Malaney et al. | |
| 2009/0183007 A1 | 7/2009 | Lim et al. | |
| 2013/0227604 A1 | 8/2013 | Shields et al. | |
| 2014/0032912 A1 | 1/2014 | Hardy et al. | |
| 2014/0143018 A1 | 5/2014 | Nies et al. | |
| 2014/0220526 A1 | 8/2014 | Sylves | |
| 2014/0280061 A1 | 9/2014 | Elkhou | |
| 2016/0026962 A1 | 1/2016 | Shankar et al. | |
| 2017/0033933 A1 | 2/2017 | Haber et al. | |
| 2017/0060846 A1 | 3/2017 | Allen et al. | |
| 2017/0180133 A1 | 6/2017 | Kumar et al. | |
| 2017/0200244 A1 | 7/2017 | Aggarwal et al. | |
| 2020/0005032 A1 | 1/2020 | Freed et al. | |
| 2020/0125827 A1 | 4/2020 | Freed et al. | |

OTHER PUBLICATIONS

Shahandashti et al.; "Threshold Attributte-Based Signatures And Their Applications To Anonymous Credential Systems", Progress in Cryptology—AFRICACRYPT 2009, Apr. 2, 2009, pp. 198-216, 32 pages.

Bringer et al.; "Efficient And Strongly Secure Dynamic Domain-Specific Pseudonymous Signatures For ID Documents", Financial Cryptography and Data Security, 2014, pp. 255-272, 17 pages.

Geva et al.; "TOPSIG: Topology Preserving Document Signatures", Proceedings of the 20th ACM international conference on Information and knowledge management, 2011, pp. 333-338, 12 pages.

Werlang et al.; "Electronic Documents With Signature Constraints", available via the Internet from https://sbseg2011.redes.unb.br/resources/downloads/wgid/94370.pdf as of Oct. 18, 2018, 8 pages.

USPTO Office Action, dated Jun. 25, 2020, U.S. Appl. No. 16/167,500, filed Oct. 22, 2018, In re Freed, 13 pages.

USPTO Notice of Allowance, dated Nov. 25, 2020, U.S. Appl. No. 16/167,500, filed Oct. 22, 2018, In re Freed, 12 pages.

USPTO Notice of Allowance, dated Jan. 6, 2020, U.S. Appl. No. 16/167,500, filed Oct. 22, 2018, In re Freed, 9 pages.

Office Action, dated Apr. 13, 2020, U.S. Appl. No. 16,024,891, filed Jul. 1, 2018, In re Freed, 9 pages.

Final Office Action, dated Sep. 11, 2020, U.S. Appl. No. 16/024,891, filed Jul. 1, 2018, In re Freed, 14 pages.

Notice of Allowance, dated Oct. 28, 2020, U.S. Appl. No. 16/024,891, filed Jul. 1, 2018, in re Freed, 8 pages.

Notice of Allowance, dated Jan. 22, 2021, U.S. Appl. No. 16/024,891, filed Jul. 1, 2018, In re Freed, 9 pages.

"List of IBM Patents or Patent Applications Treated as Related", dated Feb. 3, 2021, 2 pages.

\* cited by examiner

CLASSIFYING DIGITAL DOCUMENTS IN MULTI-DOCUMENT TRANSACTIONS BASED ON SIGNATORY ROLE ANALYSIS

CROSS REFERENCE TO RELATED APPLICATIONS

This application is a continuation of commonly assigned U.S. patent application Ser. No. 16/167,500, filed Oct. 22, 2018, which is hereby incorporated herein by reference.

BACKGROUND

1. Technical Field

This invention relates in general to computing systems and more particularly to classifying digital documents in multi-document transactions based on signatory role analysis from signature elements in the documents.

2. Description of the Related Art

To assist an auditor in performing an audit, copies of signed documents in a multi-document transaction are digitized by scanning an image of each document and storing the scanned image of each document, so that auditors review the digital, scanned image of each document in a multi-document transaction.

BRIEF SUMMARY

In one embodiment, a method is directed to receiving, by a computer system, a digital scan of a document. The method is directed to converting, by the computer system, the content of the document in the digital scan from an image into text. The method is directed to analyzing, by the computer system, the text to determine one or more predicted roles of one or more signatories, each predicted role determined based on one or more signature elements within the content of the document executed by the one or more signatories. The method is directed to evaluating, by the computer system, each of the one or more predicted roles in view of a plurality of expected signatory role characteristics of a plurality of categories of documents of a transaction to select a particular category associated with the document from among the plurality of categories. The method is directed to classifying, by the computer system, the document within the transaction as a particular logical type identified by the particular category from among a plurality of logical types for the transaction.

In another embodiment, a computer system comprises one or more processors, one or more computer-readable memories, one or more computer-readable storage devices, and program instructions, stored on at least one of the one or more storage devices for execution by at least one of the one or more processors via at least one of the one or more memories. The stored program instructions comprise program instructions to receive a digital scan of a document. The stored program instructions comprise program instructions to convert the content of the document in the digital scan from an image into text. The stored program instructions comprise program instructions to analyze the text to determine one or more predicted roles of one or more signatories, each predicted role determined based on one or more signature elements within content of the document executed by the one or more signatories. The stored program instructions comprise program instructions to evaluate each of the one or more predicted roles in view of a plurality of expected signatory role characteristics of a plurality of categories of documents of a transaction to select a particular category associated with the document from among the plurality of categories. The stored program instructions comprise program instructions to classify the document within the transaction as a particular logical type identified by the particular category from among a plurality of logical types for the transaction.

In another embodiment, a computer program product comprises a computer readable storage medium having program instructions embodied therewith, wherein the computer readable storage medium is not a transitory signal per se. The program instructions are executable by a computer to cause the computer to receive, by a computer, a digital scan of a document. The program instructions are executable by the computer to cause the computer to convert, by the computer, the content of the document in the digital scan from an image into text. The program instructions are executable by the computer to cause the computer to analyze, by the computer, the text to determine one or more predicted roles of one or more signatories, each predicted role determined based on one or more signature elements within content of the document executed by the one or more signatories. The program instructions are executable by the computer to cause the computer to evaluate, by the computer, each of the one or more predicted roles in view of a plurality of expected signatory role characteristics of a plurality of categories of documents of a transaction to select a particular category associated with the document from among the plurality of categories. The program instructions are executable by a computer to cause the computer to classify, by the computer, the document within the transaction as a particular logical type identified by the particular category from among a plurality of logical types for the transaction.

BRIEF DESCRIPTION OF THE SEVERAL VIEWS OF THE DRAWINGS

The novel features believed characteristic of one or more embodiments of the invention are set forth in the appended claims. The one or more embodiments of the invention itself however, will best be understood by reference to the following detailed description of an illustrative embodiment when read in conjunction with the accompanying drawings, wherein:

DETAILED DESCRIPTION

In the following description, for the purposes of explanation, numerous specific details are set forth to provide a thorough understanding of the present invention. It will be apparent, however, to one skilled in the art that the present invention may be practiced without these specific details. In other instances, well-known structures and devices are shown in block diagram form to avoid unnecessarily obscuring the present invention.

In addition, in the following description, for purposes of explanation, numerous systems are described. It is important to note, and it will be apparent to one skilled in the art, that the present invention may execute in a variety of systems, including a variety of computer systems and electronic devices operating any number of different types of operating systems.

Figure 1:
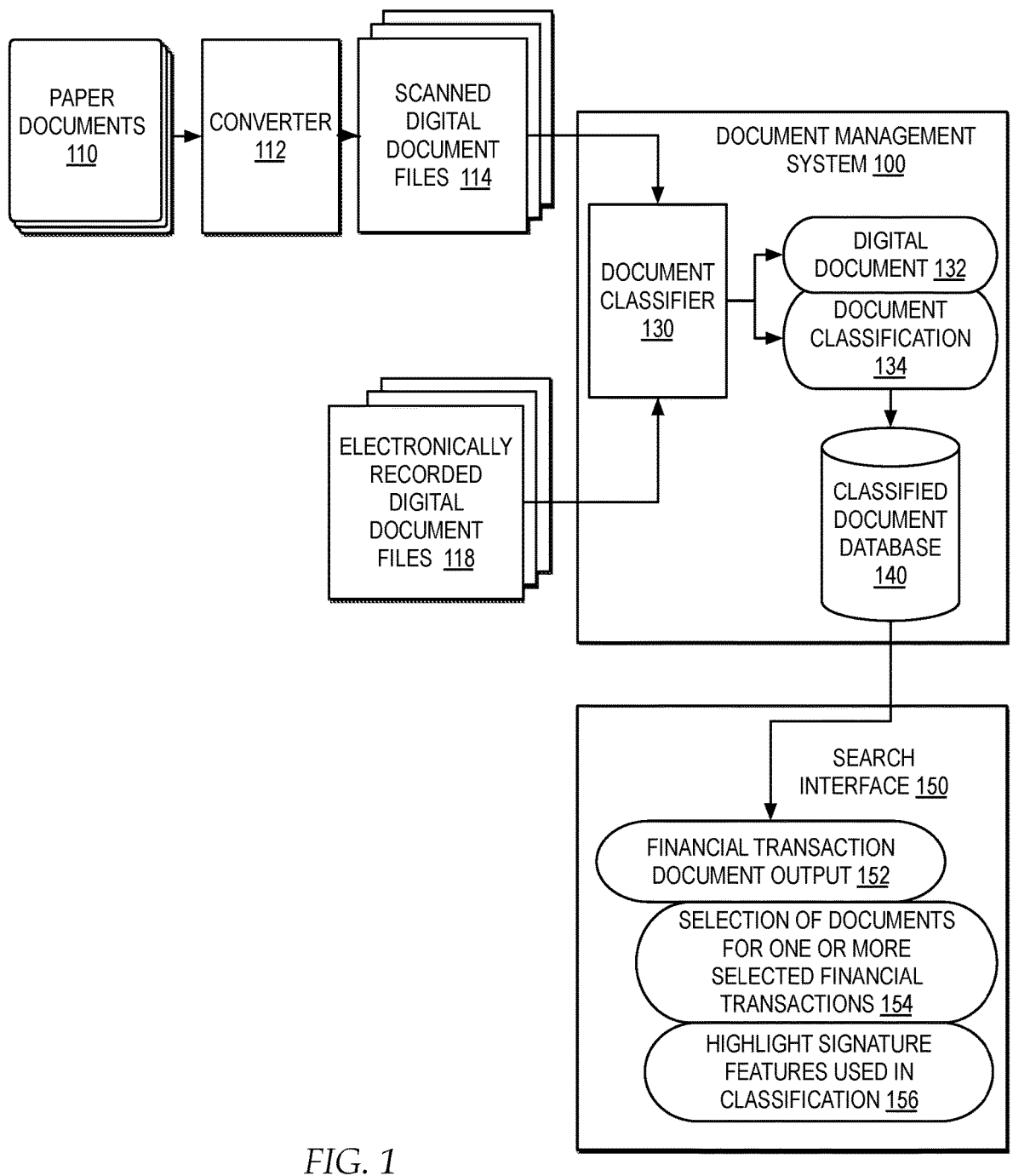
FIG. 1 is a block diagram illustrating one example of a system for classifying one or more documents of a transaction in a document management system based on signatory role analysis of one or more signature elements within the documents.

FIG. 1 illustrates a block diagram of one example of a system for classifying one or more documents of a transaction in a document management system based on signatory role analysis of one or more signature elements within the documents.

In one or more business contexts, multiple documents are executed or recorded at different times as a part of a transaction or other type of workflow that occurs over a period of time. For example, business contexts may include, but are not limited to, financial transactions, insurance transactions, and legal workflows. Each type of document within each type of transaction has an associated type of one or more expected signatory roles for the type of document in the transaction. The associated type of one or more expected signatory roles for different types of documents in the transactions is determined by one or more sets of rules such as, but not limited to, financial rules and regulatory rules. One or more of the documents in a transaction are signed within the content of the document, such as on the face of the document, to attest to the one or more signatory roles of the one or more signatories authorizing each document within the sequence of documents of the transaction over a period of time. In addition, the one or more expected signatory roles for one or more types of documents in a transaction may also include an expectation that no signatory will attest to a document, and that one or more documents in a transaction should not be signed by any signatory.

For example, for a financial transaction, such as a loan, the types of documents that accompany the loan over a period of time may include, but are not limited to, originating documents, a primary note, an appraisal document, financial statements, and additional documents. In one example, one or more of the documents added as part of a financial transaction are confirmed by one or more participants to the financial transaction through a signature on the face of a paper version of a document or a digital signature on an electronic version of a document. In addition, one or more documents added as part of a financial transaction may be expected not to include a signature. In one example, one or more types of documents in a financial transaction, such as an originating document and primary note may include one or more signature blocks each with an associated type of signatory role of "borrower" and one or more signature blocks each with an associated type of signatory role of "lender". In one example, an appraisal document in a financial transaction may include a signature block with an associated signatory role of "appraiser" and a signature block with an associated signatory role of "borrower". In one example, a loan may be supported by hundreds or thousands of pages of documentation. In addition, many documents added as part of a financial transaction include one or more dates, from one or more signers indicating the ordered, temporal position of the document in the sequence of documents of a financial transaction over a period of time. In addition, many documents added as part of a financial transaction include one or more documents added within time windows that are predictable based on the expected timeline for documents, such as one type of document in the loan expected to be filed within 30 days of another type of document in the loan.

For example, for an insurance transaction, the types of documents that accompany the insurance transaction over a period of time may include, but are not limited to, an insurance application, inspection reports, claims, claims reports, and payment confirmations. In one example, inspection reports and claims reports are expected to occur within predictable time windows relative to the date of the insurance application, within the sequence of documents of an insurance transactions, such as occurring annually, however claims documents are unpredictable and may occur at any time. In one example, one or more types of documents in an insurance transaction, such as an insurance application, may include one or more signature blocks each with an associated signatory role of "applicant". In one example, claims reports in an insurance transaction may include one or more signature blocks with an associated signatory role of "insurance adjuster".

For example, for a legal transaction, the types of documents that accompany the type of legal transaction over a period of time may include a sequence of documents that follow one or more of federal, state, and local rules regarding types of filing documents, expected signatory roles, and timelines for response. The type of transaction and rules in place for the transaction, determine the types of documents typical for the transaction and the relative predictable time windows for certain types of documents based on deadlines for response in the rules. For example, an approval memo may include one or more signatory blocks, each with an associated signatory role of "authors", one or more signatory blocks, each with an associated signatory role of "reviewers", and one or more signatory blocks, each with an associated signatory role of "approvers".

In an embodiment of the invention, in one example, a reviewer, such as but not limited to, an auditor, reviews the documents from a transaction for one or more purposes. In one example, to aid a reviewer in reviewing the documents recorded as part of a transaction, documents are stored for review in a digital format in a document management system 100. The party reviewing the documents then accesses the documents in the digital format from document management system 100.

In one example, many documents associated with a transaction are originally recorded on paper, such as paper documents 110, but are stored in a classified document database 140 of document management system 100 in a digital format. In one example, to store paper documents in a digital format, a converter 112 captures an image of paper documents 110 and applies one or more types of readers to electronically convert an image of a typed, handwritten, or printed text into machine-encoded text in scanned digital document files 114. In one example, the types of readers applied by converter 112 to electronically convert an image of paper documents 110 into machine-encoded text include, but are not limited to, an optical character recognition (OCR) reader, an optical word recognition reader, an intelligent character recognition (ICR) reader, and an intelligent word recognition (IWR) reader. In one example, converter 112 captures an image of paper documents 110 through one or more image capturing devices including, but not limited to, a scanner, a camera, and an imaging controller. In one example, converter 112 identifies both text and images, where the images are not readily convertible into text.

In an embodiment of the invention, different individual transactions of a same type include similar predictable sequences of logical types of documents and similar expected signatory roles within the sequence of logical types of documents, however the content or layout of the documents of a same logical type may vary across different providers and across different individual transactions. While some documents that are part of a transaction may include a textual label on the face of the document itself that matches the logical type of the document, such as a document falling under the logical type of "promissory note" with a textual heading within the text of the document itself of "promissory note", many documents that are part of a transaction do not include a textual label identifying or matching the logical type of the document on the face of the document. As a result, while converter 112 scans an image of paper documents 110 and converts the scanned image to text that can be read and analyzed, converter 112 does not automatically identify the logical type of each of paper documents 110 converted into scanned digital document files 114 from reading the converted text of the document. In addition, in one example, document management system 100 receives electronically recorded digital document files 118, such as an electronically signed digital document, that do not include a textual label matching a logical type of electronically recorded digital document files 118 and do not include a file name, metadata, or a file system attribute that identifies a logical type of document.

In an embodiment of the invention, to facilitate review of documents of a transaction, document management system 100 implements a document classifier 130 to automatically classify each digital document file received for a transaction into one or more categories, each associated with a different logical type of document in a transaction. As illustrated, document classifier 130 receives scanned digital document files 114 that include at least a selection of documents of unknown logical type and receives electronically recorded digital document files 118 that include at least a selection of documents of unknown logical type. Document classifier 130 determines, for each digital document file received, a digital document 132 and a document classification 134 identifying at least one category associated with a logical type from among multiple logical types of files. Document management system 100 stores each digital document 132 with identified document classification 134 in classified document database 140.

In an embodiment of the invention, document classifier 130 applies a signatory role based classification system that is trained to identify a category associated with a logical type for each document by scanning for signature elements and context surrounding signatures in signature elements in the content of digital documents and logically categorizing types of documents using the identified signatures and context based on the signatory role characteristics of each logical type of document in a transaction. In particular, document classifier 130 applies a signatory role based classification system that predicts a category of a document based on whether or not a document includes one or more signatures by signatories assigned one or more particular roles, where the one or more particular roles correlate with the expected signatory roles associated with the document. Document classifier 130 is trained by a classification model to assign a category to a document from the predicted roles, determined from scanned signatures and context, based on the expected signatory roles in association with the category of document. In one example, if document classifier 130 determines no signature is identified in the content of a document, in one example, document classifier 130 may be trained by a classification model to assign a particular category to a document from predicted roles for documents that do not include a signature, based on an expected lack of signatory roles in association with the category of document. In another example, if document classifier 130 determines not signature is identified in the content of a document, in one example, document classifier 130 may classify the document as not relevant for a signatory role based classification and applies other types of classification analysis.

In document classification 134, document classifier 130 identifies a logical type of document based on the category and one or more signatory roles applied for classifying the document. In one example, document classification 134 represents metadata added to digital document 132. In another example, document classification 134 is stored as classification data in a database entry for digital document 132 or in a separate file or file system attribute stored in classified document database 140 in association with digital document 132.

In one example, an advantage of storing each document in classified document database 140 with a separate logical type based on a signatory role based classification category is that the documents in classified document database 140 are searchable by logical type, such that an auditor or other party may more quickly sort and review selections from among large volumes of digital document files in classified document database 140, according to logical type. In one example, a search interface 150 accessing a selection of documents for one or more selected financial transactions 154 from classified document database 140 for one or more financial transactions sorts the documents into a financial transaction document output 152 of digital images of the documents ordered according to logical types determined from signatory role based classifications. In one example, an advantage of identifying documents by logical types is that an auditor or other party reviewing hundreds or thousands of documents in a single transaction is enabled to quickly access only those documents of a particular logical type that are relevant to an audit in financial transaction document output 152.

In one example, an advantage of classifying financial transaction documents based on logical types determined from signatory role based classifications performed by document classifier 130 is that the probability of accurately classifying a document is increased by performing signatory role based classifications based on the signatures and context signed on a document matching the expected signatory roles for certain logical types of documents. As the probability of accurately classifying a document increases, the need for human intervention to re-train document classifier 130 or to correct incorrect classifications by document classifier 130, decreases.

In an embodiment of the present invention, document management system 100 also includes additional classifiers or document classifier 130 trained to perform classifications based on types of data in addition to signatory role based classifications, such as a classifier trained to classify a document based on the sequential probability of expected time windows between recordings based on a date extracted from the signature context and trained to classify a document based on the frequency that one or more words appear in the text of the document, such as word clusters. Identifying the a document based on the sequential probability of expected time windows between recordings based on a date extracted from the signature context or identifying the frequency of a word in a document alone provides some context for classifying a document, however for some types of transactions, multiple types of documents may be signed on a same date or the same words may appear at similar frequencies across different logical types of documents or multiple logical types of documents may occur at a same date but with different word frequency attributes, such that by combining signatory role based and date-based classification with word frequency classification, the probability of a correct classification of a document increases.

In an embodiment of the present invention, document management system 100 also includes additional analyzers for determining categories of documents through an analyzer that extracts specific locations of a document and versions of documents based on knowledge objects and relationships to identify the category of document. In one example, if document management system 100 only manages documents received for a same type of financial transaction originating from a single financial provider where the financial provider uses a same form for each financial transaction, extracting a specific location within the document where a particular label is expected to always appear to identify a category of document may increase the efficiency of categorizing documents, however, if document management system 100 manages documents originating from different providers not all using the same form, signatory role based classification allows document management system 100 to efficiently categorize multiple documents from a same type of transaction that do not follow a form where a particular label occurs in a same location in each form.

In an embodiment illustrated in FIG. 1, in outputting the selected documents, search interface 150 highlights the output of the signatures and context within the selected documents used in the signatory role based document classifications as illustrated at reference numeral 156. In one example, the types of highlights of the date features include, but are not limited to, graphical, tactile, and audio characteristics distinguishing dates used in documents for classification from other text and images within a document within the output interface.

Figure 2:
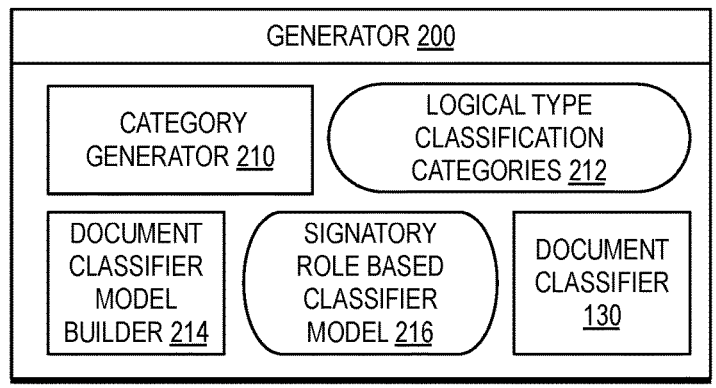
FIG. 2 illustrates a block diagram of one example of a document classifier generator for performing signatory role based classification of digital documents.

FIG. 2 illustrates a block diagram of one example of a document classifier generator for performing signatory role based classification of digital documents.

In one embodiment of the invention, a generator 200 includes a category generator 210 for selecting multiple logical type classification categories 212. In one example, category generator 210 prompts a user to selectively enter classification categories or select from among a list of classification categories for identification with a particular type of transaction. In one example, category generator 210 automatically creates a selection of document classification categories in logical type classification categories 212 from an analysis of a selection of documents for a particular transaction type that are already labeled according to type.

In one embodiment of the invention, category generator 210 determines the expected signatory role or combination of signatory roles of one type of logical document on a timeline or compared to other logical types of documents for a same transaction that uniquely identify the logical type of document. In one example, a user specifies a selection of rules for the expected signatory role or combination of signatory roles of different types of documents for a particular transaction and category generator 210 automatically determines the expected signatory roles for different logical types of documents in a transaction based on the selection of rules. In one example, category generator 210 analyzes the actual one or more signatory roles across different documents for multiple transactions of a same type to identify the expected signatory role or combination of signatory roles for different logical types of documents on a timeline or compared to other logical types of documents for a same transaction.

For example, a first logical type of document in a first type of transaction may be created with only a single signature option, of an expected first role type. Category generator 210 may determine that the expected signatory role of the first logical type of document is characterized by a single signature on a document, signed by a person authorized to sign under the first expected role type.

In another example, a second logical type of document in a second type of transaction may be created with only a single signature option, of an expected first role type, however, another logical type of document in the same transaction includes multiple signature options, of the expected first role type and an expected second role type. Category generator 210 may determine the expected signatory role of the second logical type of document is characterized by a single signature on a document, only if another logical type of document is identified for the same transaction that includes signatures by persons authorized to sign under the expected first role type and the expected second role type. In another example, a third logical type of document in a second type of transaction may be created with a no signature option, where category generator 210 may determine the expected signatory role of the third logical type of docket is characterized by no signature on a document, only if another logical type of document is identified for the same transaction that includes signatures by persons authorized to sign under the expected first role type and the expected second role type.

In one example, if category generator 210 determines that multiple logical types of documents, individually, on a timeline, or compared with other logical types of documents of a same transaction have the same expected single or combination of signatory roles, category generator 210 may identify additional characteristics of the multiple logical types of documents for distinguishing the documents from one another.

In one embodiment, category generator 210 updates logical type classification categories 212 with buckets of one or more types of documents associated with each classification category based on the one or more expected signatory roles associated with the document.

In one example, a document classifier model builder 214 builds a signatory role based classifier model 216 based on logical type classification categories 212, for application by document classifier 130. In one example, document classifier 130 represents any classifier, such as, but not limited to, a bag-of-words classifier, and signatory role based classifier model 216 represents a model applicable for the type of classifier, such as, but not limited to, a bag-of-words model, with signatory role related features of logical type classification categories 212 appended. In one example, a bag-of-words model is a representation also known as a vector space model, used in natural language processing and information retrieval (IR), where text is represented as a bag, or multiset, of its words, disregarding grammar and word order, but maintaining multiplicity. In one example, a bag-of-words model is used in document classification where the frequency of occurrence of each word is used as a feature for training the classifier. In the example, document classifier 130 generates signatory role based classifier model 216 to classify predicted roles determined from scanned signatures and context of a document and appends signatory role related features from logical type classification categories 212 to classify logical document types based on signatory roles.

In one example, document classifier 130 is trained with signatory role based classifier model 216 and outputs logical type labels for each classification category. In one example, by training document classifier 130 with signatory role based classification categories, for financial transaction documents or other documents with logical types that are identifiable by one or more predictable, expected signatory roles, document classifier 130 automatically, efficiently classifies digital documents with a high probability of accuracy.

Figure 3:
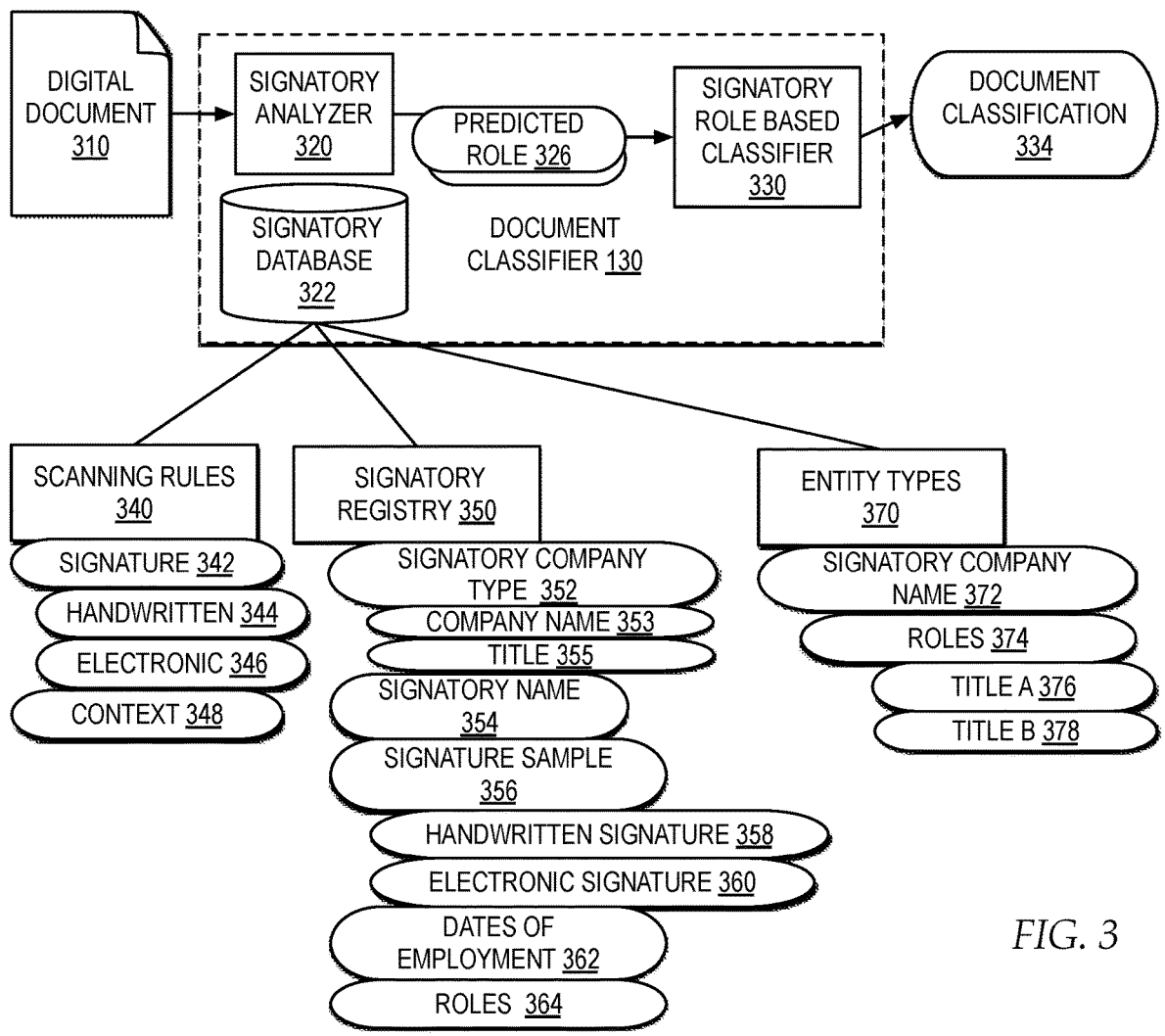
FIG. 3 illustrates a block diagram of an example of a document classifier for signatory role based categorization of a document according to logical type as part of a multi-document transaction.

FIG. 3 illustrates a block diagram of an example of a document classifier for signatory role based categorization of a document according to logical type as part of a multi-document transaction.

In an embodiment of the invention, document classifier 130 receives a digital document 310, where digital document 310 represents a document file from among scanned digital document files 114 or electronically recorded digital document files 118. Digital document 310 includes one or more pages.

In one embodiment, a signatory analyzer 320 of document classifier 130 scans each page of digital document 310 to identify and extract one or more handwritten signatures and electronic signatures according to one or more scanning rules 340 in signatory database 322. For example, scanning rules 340 include one or more signature scanning rules 342, specified according to the type of signature, including, but not limited to, handwritten 344 and electronic 346. In addition, rules in scanning rules 342 specifies rules for identifying signatures in different formats, such as, but not limited to, a full signature and initials. In addition, in one embodiment, signatory analyzer 320 also identifies one or more context elements proximate to each signature identified within digital document 310 and extracts one or more context elements, according to scanning rules 340. In one example, context elements identified in context 348 for scanning may include, but are limited to, a role identifier, a signatory name, a company name, and a date.

According to another aspect, in identifying context proximate to a signature, signatory analyzer 320 may first scan areas surrounding an image in a document and the content around the image to identify whether the image is a signature block. In one example, signatory analyzer 320 determines that the content around an image includes words or keywords indicating "title" or "date" and identifies the image as a signature block and the surrounding content as context. In another example, signatory analyzer 320 determines that the content around a signature incudes a next line or subsequent line with a name and identifies the image as a signature block and the surrounding content as context. In another example, signatory analyzer 320 detects an image identifiable as a digital signature and identifies the digital signature as a signature block.

In one embodiment, signatory analyzer 320 compares the extracted signature and context elements with one or more catalogued signatures in a signatory registry 350 of signatory database 322 to predict one or more signatory roles of each extracted signature in digital document 310. Signatory analyzer 320 passes each predicted role 326 to signature-based classifier 330, where signature based classifier 330 classifies the logical type of document based the combination of predicted roles and outputs a document classification 334.

For example, signatory registry 350 includes a registry of records identifying one or more key people who may be authorized to sign documents. For example, signatory registry 350 may include separate records for bankers, appraisers, attorneys, clerks, notaries, and others who may regularly sign documents. In one example, each record in signatory registry 350 may include one or more of a signatory company type 352, as identified by one or more of a company name 353 and title 355, a signatory name, a signature sample 356, including one or more examples of a handwritten signature 358 and an electronic signature 360, dates of employment 362, and one or more roles 364.

In one example, a user may select to create or update a record in signatory registry 350. In another example, as documents are scanned and analyzed by signatory analyzer 320, signatory analyzer 320 may create a new record or update an existing record in signatory registry 350 for an extracted signature and prompt a user to provide additional data for completing the record.

In one example, signatory analyzer 320 identifies an extracted signature and a context element of a role identifier, such as the word "borrower" extracted proximate to the extracted signature. In the example, signatory analyzer 320 compares the extracted signature with signature samples for multiple records in signatory registry 350 to search for a signature sample that most likely matches the extracted signature. In addition, signatory analyzer 320 compares the role identifier in the selection of records with signature samples that most likely match the extracted signature against the role specified in the selection of records, to determine whether the role identifier matches one or more of the roles identified for the registered signatory. While the role identifier of "borrower" alone provides an indicator of a predicted role for the signatory, determining that both the extracted signature and the extracted role identifier match a signature sample and a role in a record in signatory registry 350, increases the probability that the predicted role is correct and that the signatory was authorized to sign under the predicted role. Based on identifying a most likely matching record in signatory registry 350 for the extracted signature and role identifier, signatory analyzer 320 passes an identified role 326 of the role identifier for the signature to signature based classifier 330.

In one example, signatory analyzer 320 identifies an extracted signature and context elements of a company name and a date. In the example, signatory analyzer 320 first determines a selection of records in signatory registry 350 including a signatory company name 353 matching the extracted company name element and with dates of employment 362 that are not outside the time range reflected by the extracted date. In the example, by comparing the extracted date with the dates of employment 362, the probability that signatory analyzer 320 correctly matches the extracted signature to a signature in a record, and therefore the probability of predicting the correct role, increases. Signatory analyzer 320 compares the extracted signature with the signature sample elements of the selection of records. Based on identifying a most likely matching record in signatory registry 350 for the extracted signature, company name, and date, signatory analyzer selects one or more expressly identified roles 364 identified for the most likely matching record as predicted role 326.

In one example, roles 364 of a record in signatory registry 350 may be implied through a lookup to entity types 370, in signatory database 322. In one example, entity types 370 may include entries that identify, for a signatory company name 372, one or more roles 374 assigned to the signatory company name based on titles for the company. For example, an entry in signatory registry 350 for a banker "user A" of a bank "bank A" may expressly include a role identifier in roles 364 of "loan approver". In another example, an entry in signatory registry 350 for the banker "user A" of "bank A" may identify a title 355 of "banker", but not include an entry in roles 364, however, entity types 370 may include a role entry for filling in roles 364, identifying that for "bank A", the role of "loan approver" is the role assigned to individuals with the title of "banker".

In one embodiment, signatory analyzer 320, in passing predicted role 326 to signatory role based classifier 330, may include one or more additional types of data collected that may be relevant to uniquely identifying each predicted role. For example, predicted role 326 may include a document identifier, page identifier, position of signatures within a page, percentage probability of the role selection in predicted role 326, and additional context elements identified in the document.

In one embodiment, if signatory analyzer 320 identifies no signature element within digital document 310, signatory analyzer 320 may determine based on the lack of signature or the lack of signature in combination with other elements extracted from digital document 310, that the predicted role for the document is "no signature". In one example, signatory database 322 specifies the types of elements, which if extracted from a digital document that has no signature element, trigger identification of the predicted role for the document of "no signature".

In one embodiment, signatory role based classifier 330, as trained by signatory role based classifier model 216, selects one or more classification categories for the one or more predicted role 326 in view of signatory role characteristics of categories of documents in a transaction and outputs a logical type label associated with the selected category, along with each matching signatory registry entry as document classification 334 for storage in a classified document database 140.

In one example, signatory role based classifier 330 may collect predicted role 326 for a single document or across multiple documents to select one or more classification categories for the one or more predicted role 326 in view of signatory role characteristics of categories of documents in a transaction. In one example, each of the predicted role 326 may identify a digital document identifier and a page identifier to assist signatory role based classifier 330 in collecting and analyzing predicted role 326 received for a single document or multiple documents.

Figure 4:
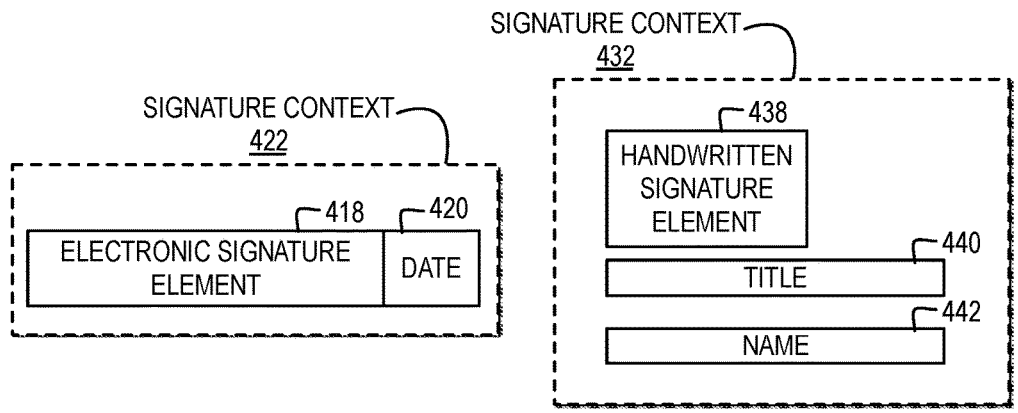
FIG. 4 is a block diagram illustrating one example of the types of signature blocks from which a signatory analyzer extracts a signature and context according to scanning rules.

FIG. 4 illustrates a block diagram of one example of the types of signature blocks from which a signatory analyzer extracts a signature and context according to scanning rules.

In one example, a first signatory block extracted from a document includes an electronic signature element 418. In the example, when signatory analyzer 320 detects an electronic signature, such as electronic signature element 418, scanning rules 340 specify a scanning area for signature context proximate to electronic signature element 418, illustrated by reference numeral 422. In the example, a date 420 is illustrated as a context element extracted within signature context 422. In additional or alternate examples, additional context elements, such as a company name, title, signatory name, or role identifier may be extracted from signatory context 422, if present.

In one example, a second signatory block extracted from a document includes a handwritten signature element 438. In the example, when signatory analyzer 320 detects a handwritten signature, such as handwritten signature element 438, scanning rules 340 specify a scanning area for signature context proximate to handwritten signature element 438, illustrated by reference numeral 432. In the example, a title 440 and a name 442 are illustrated as context elements extracted within signature context 432. In additional or alternate examples, additional context elements, such as a date, a company name, or role identifier may be extracted from signatory context 432, if present.

Figure 5:
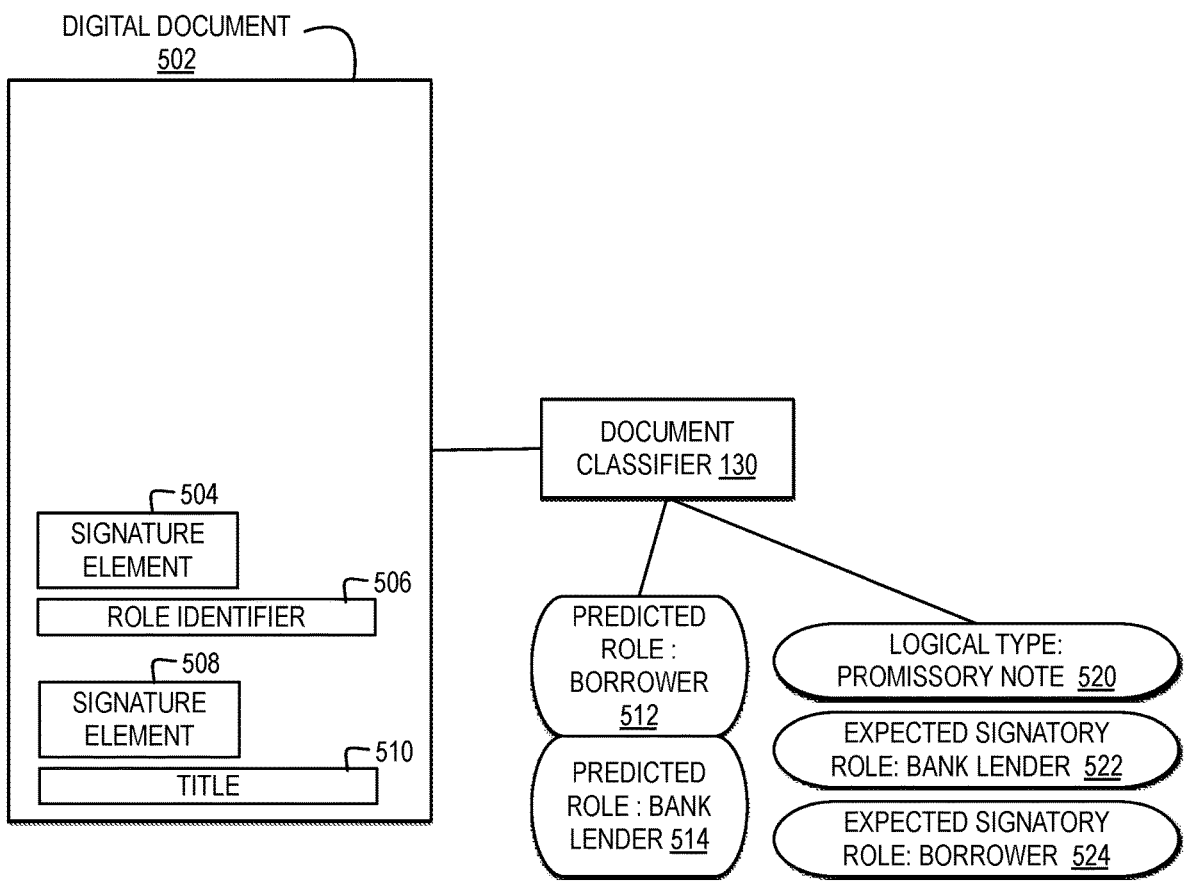
FIG. 5 illustrates a block diagram of one example of a digital document classified with a logical type of a promissory note based on expected signatory roles.

FIG. 5 illustrates a block diagram of one example of a digital document classified with a logical type of a promissory note based on expected signatory roles.

In the example, a digital document 502 includes multiple signature elements extracted by signatory analyzer 320 of document classifier 130. In the example, signatory analyzer 320 extracts a signature element 504 with an associated context element of a role identifier 506 and a signature element 508 with an associated context element of a title 510. For example, role identifier 506 may represent text of "borrower" and title 510 may represent text of "banker".

In the example, based on the extracted signatures and context elements, in view of one or more most likely records in signatory registry 350, signatory analyzer 320 determines a predicted role of "borrower" 512 and a predicted role of "bank lender" 514. In the example, signatory analyzer 320 determines that the title of "banker", for a company the signer is associated with, is associated under entity types 370 with a role of "bank lender".

In the example, signatory role based classifier 330 receives the predicted role inputs of "borrower" and "bank lender" and determines if there is any logical type of document that is expected to likely have signatory roles of "borrower" and "bank lender". In the example, signatory role based classifier 330 is trained to classify a logical type of "promissory note" 520 for an expected signatory role of "bank lender" 522 and an expected signatory role of "borrower" 524.

Figure 6:
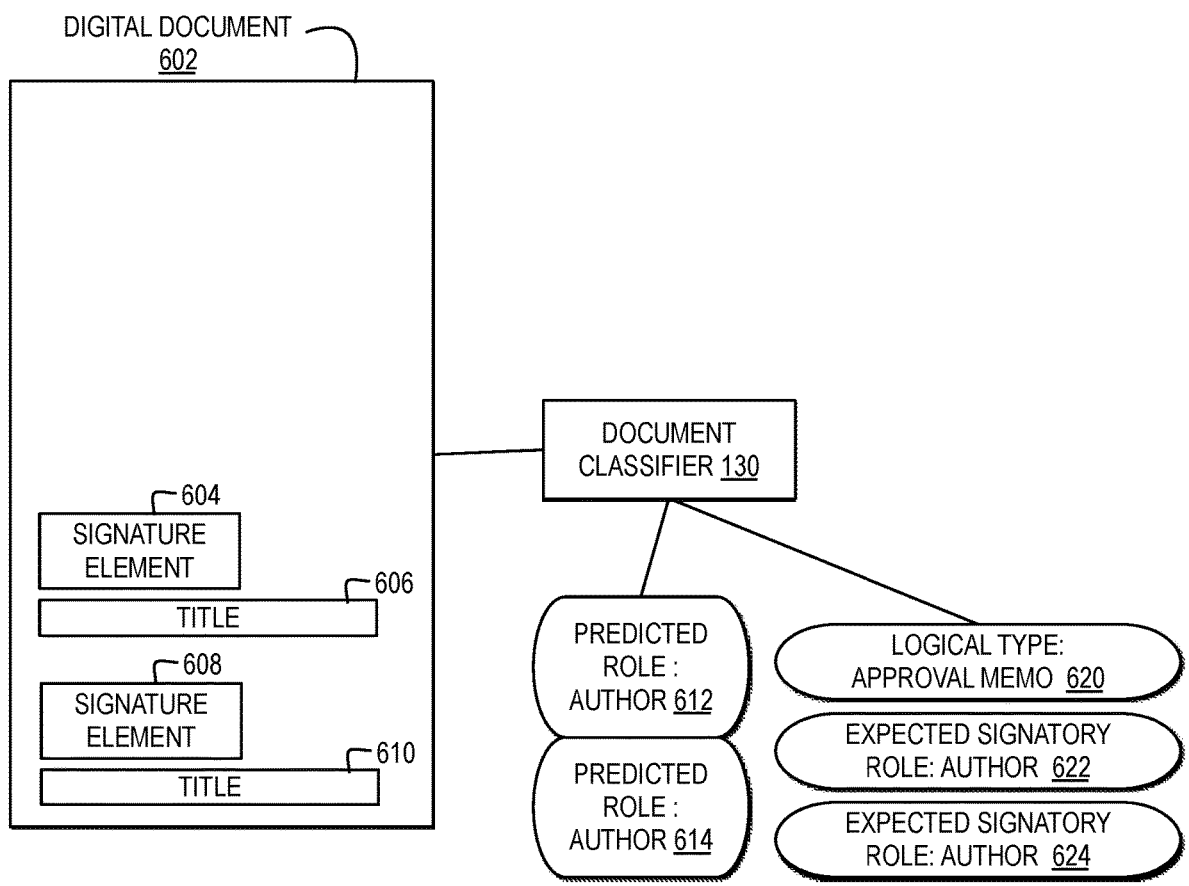
FIG. 6 illustrates a block diagram of one example of a digital document classified with a logical type of an approval memo based on expected signatory roles.

FIG. 6 illustrates a block diagram of one example of a digital document classified with a logical type of an approval memo based on expected signatory roles.

In the example, a digital document 602 includes multiple signature elements extracted by signatory analyzer 320 of document classifier 130. In the example, signatory analyzer 320 extracts a signature element 604 with an associated context element of a title 606 and a signature element 608 with an associated context element of a title 610. For example, title 606 may represent text of "lead tester" and title 510 may represent text of "tester".

In the example, based on the extracted signatures and context elements, in view of one or more most likely records in signatory registry 350, signatory analyzer 320 determines a predicted role of "author" 612 and a predicted role of "author" 614. In the example, signatory analyzer 320 determines that the title of "lead tester" and "tester", for the signers is associated in the signatory records for both signers with a role of "author".

In the example, signatory role based classifier 330 receives the predicted role inputs of "author" and "author" and determines if there is any logical type of document that is expected to likely have signatory roles of "author" and "author". In the example, signatory role based classifier 330 is trained to classify a logical type of "approval memo" 620 for an expected signatory role of "author" 622 and an expected signatory role of "author" 624.

Figure 7:
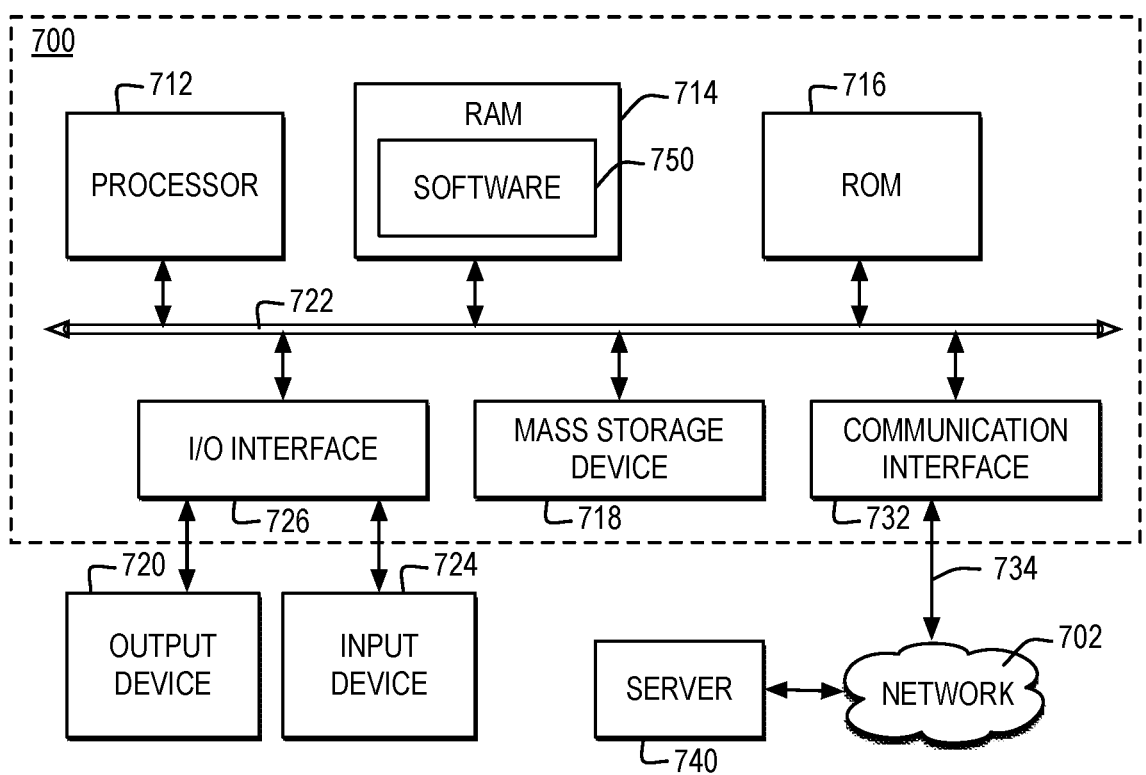
FIG. 7 illustrates a block diagram of one example of a computer system in which one embodiment of the invention is implemented.

FIG. 7 illustrates a block diagram of one example of a computer system in which one embodiment of the invention is implemented. An embodiment of the present invention is performed in a variety of systems and combinations of systems, made up of functional components, such as the functional components described with reference to a computer system 700 and communicatively connected to a network, such as network 702.

Computer system 700 includes a bus 722 or other communication device for communicating information within computer system 700, and at least one hardware processing device, such as processor 712, coupled to bus 722 for processing information. Bus 722 preferably includes low-latency and higher latency paths that are connected by bridges and adapters and controlled within computer system 700 by multiple bus controllers. According to one aspect, when implemented as a server or node, computer system 700 include multiple processors designed to improve network servicing power.

In one embodiment, processor 712 is at least one general-purpose processor that, during normal operation, processes data under the control of software 750, which includes at least one of application software, an operating system, middleware, and other code and computer executable programs accessible from a dynamic storage device such as random access memory (RAM) 714, a static storage device such as Read Only Memory (ROM) 716, a data storage device, such as mass storage device 718, or other data storage medium. According to one aspect, software 750 includes, but is not limited to, code, applications, protocols, interfaces, and processes for controlling one or more systems within a network including, but not limited to, an adapter, a switch, a server, a cluster system, and a grid environment.

In one embodiment, computer system 700 communicates with a remote computer, such as server 740, or a remote client. In one example, server 740 is connected to computer system 700 through any type of network, such as network 702, through a communication interface, such as network interface 732, or over a network link that may be connected, for example, to network 702.

In the example, multiple systems within a network environment are communicatively connected via network 702, which is the medium used to provide communications links between various devices and computer systems communicatively connected. According to one aspect, network 702 includes permanent connections such as wire or fiber optics cables and temporary connections made through telephone connections and wireless transmission connections, for example, and may include routers, switches, gateways and other hardware to enable a communication channel between the systems connected via network 702. According to one aspect, network 702 represents one or more of packet-switching based networks, telephony based networks, broadcast television networks, local area and wire area networks, public networks, and restricted networks.

In one embodiment, network 702 and the systems communicatively connected to computer 700 via network 702 implement one or more layers of one or more types of network protocol stacks which may include one or more of a physical layer, a link layer, a network layer, a transport layer, a presentation layer, and an application layer. For example, according to one aspect, network 702 implements one or more of the Transmission Control Protocol/Internet Protocol (TCP/IP) protocol stack or an Open Systems Interconnection (OSI) protocol stack. In addition, according to another aspect, network 702 represents the worldwide collection of networks and gateways that use the TCP/IP suite of protocols to communicate with one another. In one example, network 702 implements a secure HTTP protocol layer or other security protocol for securing communications between systems.

In the example, network interface 732 includes an adapter 734 for connecting computer system 700 to network 702 through a link and for communicatively connecting computer system 700 to server 740 or other computing systems via network 702. Although not depicted, network interface 732 may include additional software, such as device drivers, additional hardware and other controllers that enable communication. When implemented as a server, according to one aspect, computer system 700 includes multiple communication interfaces accessible via multiple peripheral component interconnect (PCI) bus bridges connected to an input/output controller, for example. In this manner, in one example, computer system 700 allows connections to multiple clients via multiple separate ports and each port also supports multiple connections to multiple clients.

Figure 8:
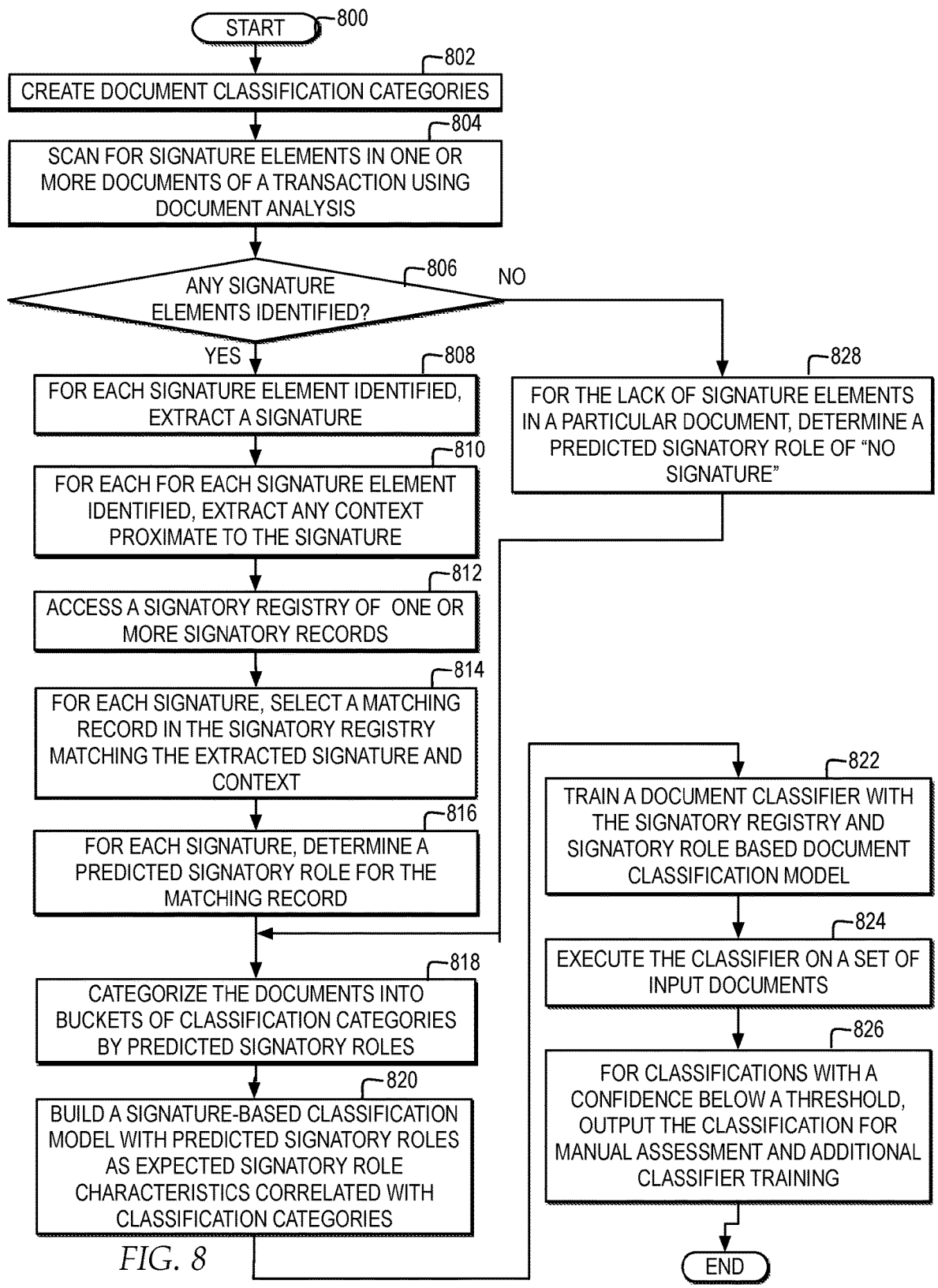
FIG. 8 illustrates a high level logic flowchart of a process and computer program for generating a signatory role based document classifier.
Figure 9:
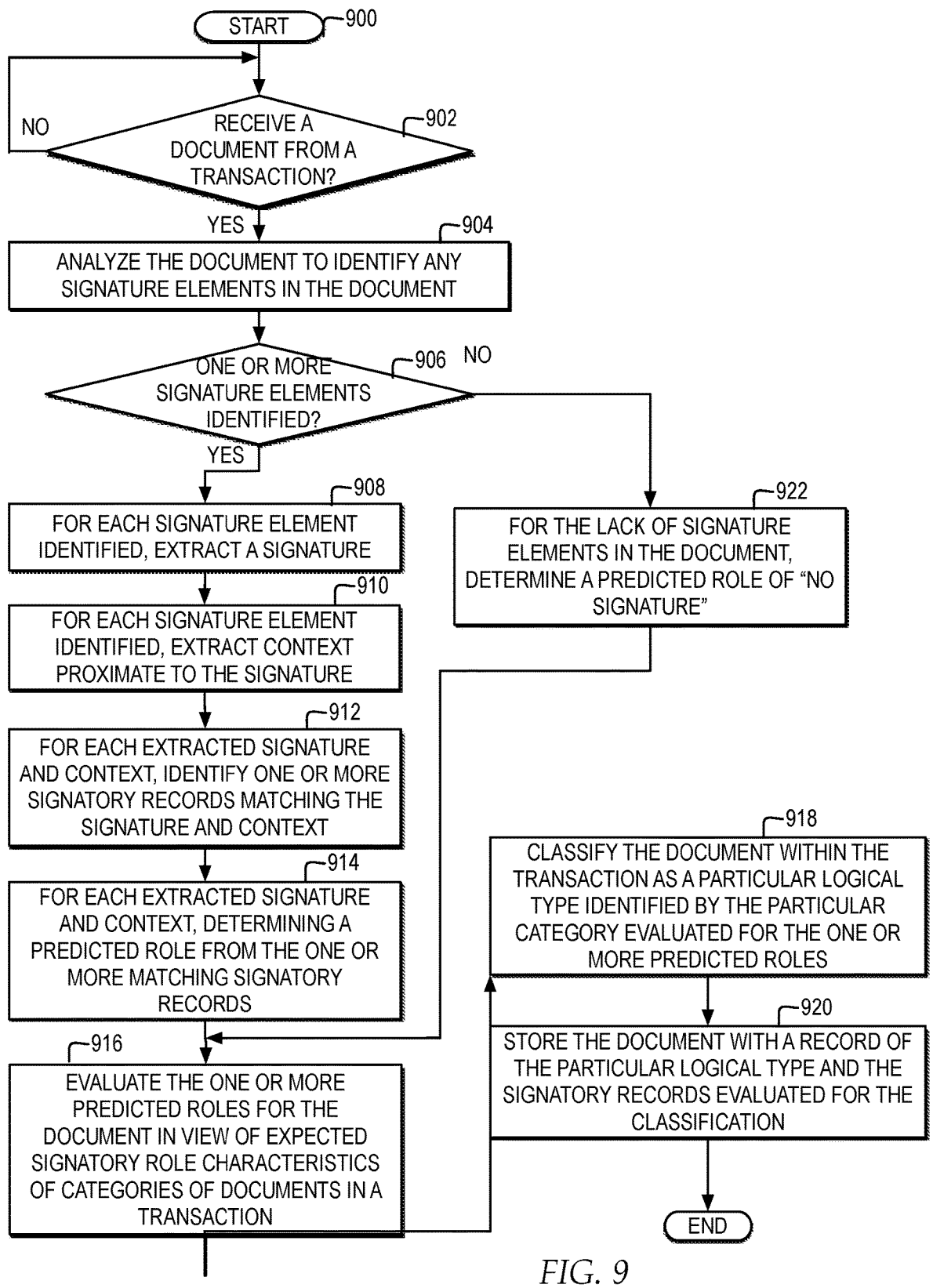
FIG. 9 illustrates a high level logic flowchart of a process and computer program for classifying a document in a multi-document transaction by applying a signatory role based document classifier.
Figure 10:
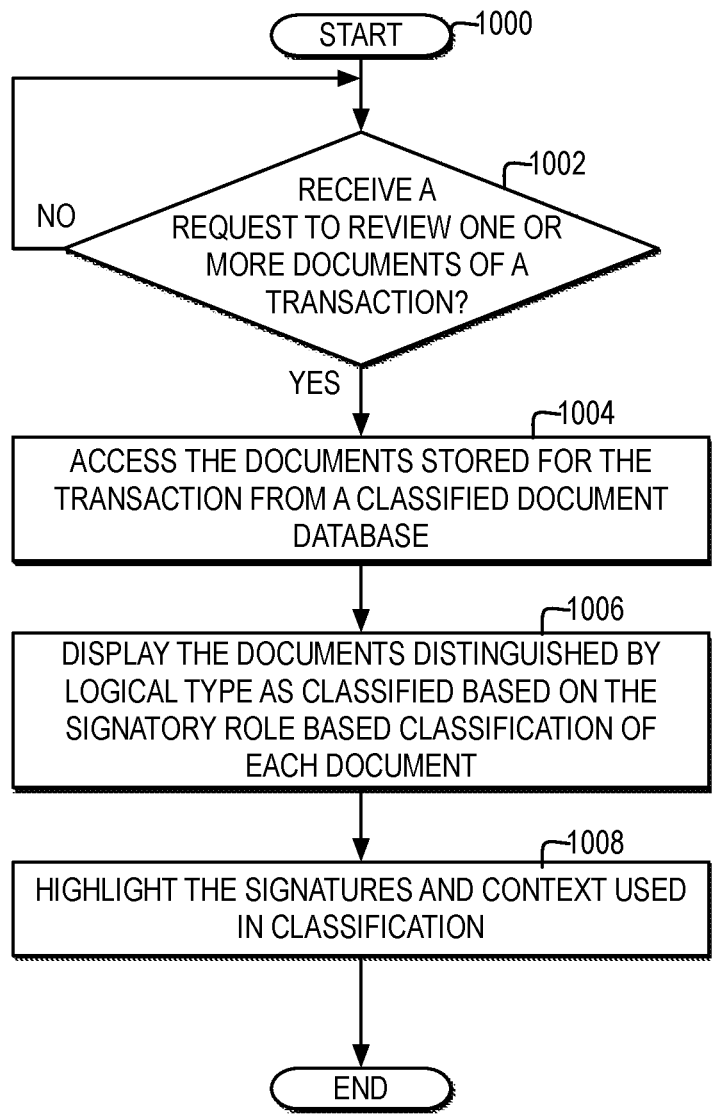
FIG. 10 illustrates a high level logic flowchart of a process and computer program for outputting results of a signatory role based classification of a one or more documents of a transaction.

In one embodiment, the operations performed by processor 712 control the operations of flowchart of FIGS. 8-10 and other operations described herein. In one embodiment, operations performed by processor 712 are requested by software 750 or other code or the steps of one embodiment of the invention might be performed by specific hardware components that contain hardwired logic for performing the steps, or by any combination of programmed computer components and custom hardware components. In one embodiment, one or more components of computer system 700, or other components, integrated into one or more components of computer system 700, contains hardwired logic for performing the operations of flowcharts in FIGS. 8-10.

In addition, in one embodiment, computer system 700 includes multiple peripheral components that facilitate input and output. These peripheral components are connected to multiple controllers, adapters, and expansion slots, such as input/output (I/O) interface 726, coupled to one of the multiple levels of bus 722. For example, input device 724 includes, for example, a microphone, a video capture device, an image scanning system, a keyboard, a mouse, or other input peripheral device, communicatively enabled on bus 722 via I/O interface 726 controlling inputs. In addition, for example, output device 720 communicatively enabled on bus 722 via I/O interface 726 for controlling outputs includes, for example, one or more graphical display devices, audio speakers, and tactile detectable output interfaces, but may also include other output interfaces. In alternate embodiments of the present invention, additional or alternate input and output peripheral components may be added.

With respect to FIG. 7, one or more embodiments of the present invention include a system, a method, and/or a computer program product. In one embodiment, the computer program product includes a computer readable storage medium (or media) having computer readable program instructions thereon for causing a processor to carry out aspects of the present invention.

In one embodiment, the computer readable storage medium is a tangible device that can retain and store instructions for use by an instruction execution device. According to one aspect, the computer readable storage medium is, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

In one embodiment, computer readable program instructions described herein are downloaded to respective computing/processing devices from a computer readable storage medium or to an external computer or external storage device via a network, for example, the Internet, a local area network, a wide area network and/or a wireless network. According to one aspect, the network comprises copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

In one embodiment, computer readable program instructions for carrying out operations of the present invention include, but are not limited to, assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. According to one aspect, the computer readable program instructions execute entirely on the user's computer, partly on the user's computer, as a stand-alone software package, partly on the user's computer and partly on a remote computer or entirely on the remote computer or server. In the latter scenario, according to one aspect, the remote computer is connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Those of ordinary skill in the art will appreciate that the hardware depicted in FIG. 7 may vary. Furthermore, those of ordinary skill in the art will appreciate that the depicted example is not meant to imply architectural limitations with respect to the present invention.

FIG. 8 illustrates a high level logic flowchart of a process and computer program for generating a signatory role based document classifier.

In one example, the process and program start at block 800 and thereafter proceeds to block 802. Block 802 illustrates creating document classification categories for a transaction. Next, block 804 illustrates scanning for signature elements in one or more documents of a transaction using document analysis. Thereafter, block 806 illustrates determining whether any signature elements are identified in each document. At block 806, if no signature elements are identified in a particular document, then the process passes to block 828. Block 828 illustrates, for the lack of signature elements in a particular document, determine a predicted signatory role of "no signature", and the process passes to block 818.

Returning to block 806, if one or more signature elements are identified in one or more documents, then the process passes to block 808. Block 808 illustrates, for each signature element identified, extracting a signature. Next, block 810 illustrates, for each signature element identified, extracting any context proximate to the signature. Thereafter, block 812 illustrates accessing a signatory registry of one or more signatory records. Next, block 814 illustrates, for each signature, selecting a matching record in the signatory registry matching the extracted signature and context. Thereafter, block 816 illustrates, for each signature, determining a predicted signatory role for the matching record. Next, block 818 illustrates categorizing the documents into buckets of classification categories by predicted signatory roles. Next, block 820 illustrates building a signature-based classification model with predicted signatory roles as expected signatory role characteristics correlated with classification categories. Thereafter, block 822 illustrates training a document classifier with the signatory registry and signatory role based document classification model. In one embodiment, the document classifier is an existing classifier for applying classification based on embedded context in addition to signatures. Next, block 824 illustrates executing the classifier on a set of input documents for a transaction. Thereafter, block 826 illustrates that for classifications returned by the classifier with a confidence below a threshold, outputting the classification for manual assessment, and additional classifier training, and the process ends.

FIG. 9 illustrates a high level logic flowchart of a process and computer program for classifying a document in a multi-document transaction by applying a signatory role based document classifier.

In one example, a process and computer program product start at block 900 and thereafter proceed to block 902. Block 902 illustrates a determination whether a document from a transaction is received. At block 902, if a document from a transaction is received, then the process passes to block 904. Block 904 illustrates analyzing the document to identify any signature elements in the document. Block 906 illustrates a determination whether one or more signature elements are identified in the document. At block 906, if no signature elements are identified, then the process passes to block 922. Block 922 illustrates, for the lack of signature elements in the document, determining a predicted role of "no signature".

Returning to block 906, at block 906, if one or more signature elements are identified in the document, then the process passes to block 908. Block 908 illustrates, for each signature element identified, extracting a signature. Next, block 910 illustrates, for each signature element identified, extracting any context proximate to the signature. Thereafter, block 912 illustrates, for each extracted signature and context, identifying one or more signatory records matching the signature and context. Next, block 914 illustrates, for each extracted signature and context, determining a predicted role from the one or more matching signatory records. Thereafter, block 916 illustrates evaluating the one or more predicted roles for the document in view of expected signatory role characteristics of documents in a transaction. Next, block 918 illustrates classifying the document within the transaction as a particular logical type identified by the particular category evaluated for the one or more predicted roles. Thereafter, block 920 illustrates storing the document with a record of the particular logical type and the signatory records evaluated for the classification, and the process ends.

FIG. 10 illustrates a high level logic flowchart of a process and computer program for outputting results of a signatory role based classification of a one or more documents of a transaction.

In one example, a process and computer program product start at block 1000 and thereafter proceed to block 1002. Block 1002 illustrates a determination whether a request is received to review one or more documents of a transaction. At block 1002, if a request is received to review one or more documents of a transaction, then the process passes to block 1004. Block 1004 illustrates accessing the documents stored for the transaction from a classified document database. Next, block 1006 illustrates displaying the documents groups distinguished by logical type as classified based on the signatory role based classification of each document. Thereafter, block 1008 illustrates highlighting the embedded signatures and context used in the classification, and the process ends.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, occur substantially concurrently, or the blocks may sometimes occur in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising", when used in this specification specify the presence of stated features, integers, steps, operations, elements, and/or components, but not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the one or more embodiments of the invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described to best explain the principles of the invention and the practical application, and to enable others of ordinary skill in the art to understand the invention for various embodiments with various modifications as are suited to the particular use contemplated.

The foregoing description is just an example of embodiments of the invention, and variations and substitutions. While the invention has been particularly shown and described with reference to one or more embodiments, it will be understood by those skilled in the art that various changes in form and detail may be made therein without departing from the spirit and scope of the invention.

What is claimed is:

1. A method comprising:
receiving, by a computer system, a digital scan of a document;
converting, by the computer system, the content of the document in the digital scan from an image into text;
analyzing, by the computer system, the text to determine one or more predicted roles of one or more signatories, each predicted role determined based on the one or more signature elements within content of the document executed by the one or more signatories;
evaluating, by the computer system, each of the one or more predicted roles in view of a plurality of expected signatory role characteristics of a plurality of categories of documents of a transaction to select a particular category associated with the document from among the plurality of categories; and
classifying, by the computer system, the document within the transaction as a particular logical type identified by the particular category from among a plurality of logical types for the transaction;
building, by the computer system, a classification model to evaluate each of the one or more predicted roles of the one or more signatories as expected signatory role characteristics correlated with the particular category; and
training, by the computer system, a document classifier with the classification model and a signatory registry of a plurality of signatory records.

2. The method according to claim 1, wherein analyzing, by the computer system, the text to determine one or more predicted roles of the one or more signatories, each predicted role determined based on one or more signature elements within content of the document executed by the one or more signatories further comprises:
extracting, by the computer system, a separate selection of text proximate to each of the one or more signature elements, each separate selection of text comprising context for a particular signature element proximate to the selection of text;
identifying, by the computer system, for each of the one or more signature elements and context, one or more selected signatory records from among a plurality of signatory records, wherein each of the one or more selected signatory records match a particular signature element and context from among the one or more signature elements and context; and
determining, by the computer system, for each of the one or more signature elements and context, a separate predicted role from among a plurality of roles from the one or more selected signatory records.

3. The method according to claim 2, further comprising:
accessing, by the computer system, the plurality of signatory records, each signatory record specifying one or more of a signatory company type, a signatory name, a signature sample, dates of employment and one or more roles.

4. The method according to claim 2, wherein identifying, by the computer system, for each of the one or more signature elements and context, one or more selected signatory records from among a plurality of signatory records, wherein each of the one or more selected signatory records match a particular signature element and context from among the one or more signature elements and context further comprises:
comparing, by the computer system, a particular signature element of the one or more signature elements with a separate signature sample in each of the plurality of signatory records; and
identifying, by the computer system, the one or more selected signatory records from among the plurality of signatory records comprising the separate signature sample matching the particular signature element.

5. The method according to claim 4, further comprising:
identifying, by the computer system, a date from the context associated with a particular signature element from among the one or more signature elements; and
removing, by the computer system, any of the one or more selected signatory records comprising a range of employment dates that do not include the date.

6. A computer program product comprising:
a set of storage device(s); and
computer code stored collectively in the set of storage device(s), with the computer code including data and instructions to cause a processor(s) set to perform at least the following operations:
receiving, by a computer system, a digital scan of a document,
converting, by the computer system, the content of the document in the digital scan from an image into text,
analyzing, by the computer system, the text to determine one or more predicted roles of one or more signatories, each predicted role determined based on the one or more signature elements within content of the document executed by the one or more signatories,
evaluating, by the computer system, each of the one or more predicted roles in view of a plurality of expected signatory role characteristics of a plurality of categories of documents of a transaction to select a particular category associated with the document from among the plurality of categories, and
classifying, by the computer system, the document within the transaction as a particular logical type identified by the particular category from among a plurality of logical types for the transaction,
building, by the computer system, a classification model to evaluate each of the one or more predicted roles of the one or more signatories as expected signatory role characteristics correlated with the particular category, and training, by the computer system, a document classifier with the classification model and a signatory registry of a plurality of signatory records.

7. The computer program product according to claim 6, wherein analyzing, by the computer system, the text to determine one or more predicted roles of the one or more signatories, each predicted role determined based on one or more signature elements within content of the document executed by the one or more signatories further comprises:

extracting, by the computer system, a separate selection of text proximate to each of the one or more signature elements, each separate selection of text comprising context for a particular signature element proximate to the selection of text;

identifying, by the computer system, for each of the one or more signature elements and context, one or more selected signatory records from among a plurality of signatory records, wherein each of the one or more selected signatory records match a particular signature element and context from among the one or more signature elements and context; and determining, by the computer system, for each of the one or more signature elements and context, a separate predicted role from among a plurality of roles from the one or more selected signatory records.

8. The computer program product according to claim 7, wherein the computer code further includes instructions for causing the processor(s) set to perform the following operation(s):

accessing, by the computer system, the plurality of signatory records, each signatory record specifying one or more of a signatory company type, a signatory name, a signature sample, dates of employment and one or more roles.

9. The computer program product according to claim 7, wherein identifying, by the computer system, for each of the one or more signature elements and context, one or more selected signatory records from among a plurality of signatory records, wherein each of the one or more selected signatory records match a particular signature element and context from among the one or more signature elements and context further comprises:

comparing, by the computer system, a particular signature element of the one or more signature elements with a separate signature sample in each of the plurality of signatory records; and identifying, by the computer system, the one or more selected signatory records from among the plurality of signatory records comprising the separate signature sample matching the particular signature element.

10. The computer program product according to claim 9, wherein the computer code further includes instructions for causing the processor(s) set to perform the following operation(s):

identifying, by the computer system, a date from the context associated with a particular signature element from among the one or more signature elements; and removing, by the computer system, any of the one or more selected signatory records comprising a range of employment dates that do not include the date.

11. A computer system comprising:

a processor(s) set;

a set of storage device(s); and computer code stored collectively in the set of storage device(s), with the computer code including data and instructions to cause the processor(s) set to perform at least the following operations:

receiving, by a computer system, a digital scan of a document, converting, by the computer system, the content of the document in the digital scan from an image into text, analyzing, by the computer system, the text to determine one or more predicted roles of one or more signatories, each predicted role determined based on the one or more signature elements within content of the document executed by the one or more signatories, evaluating, by the computer system, each of the one or more predicted roles in view of a plurality of expected signatory role characteristics of a plurality of categories of documents of a transaction to select a particular category associated with the document from among the plurality of categories, and classifying, by the computer system, the document within the transaction as a particular logical type identified by the particular category from among a plurality of logical types for the transaction, building, by the computer system, a classification model to evaluate each of the one or more predicted roles of the one or more signatories as expected signatory role characteristics correlated with the particular category, and training, by the computer system, a document classifier with the classification model and a signatory registry of a plurality of signatory records.

12. The computer system according to claim 11, wherein analyzing, by the computer system, the text to determine one or more predicted roles of the one or more signatories, each predicted role determined based on one or more signature elements within content of the document executed by the one or more signatories further comprises:

extracting, by the computer system, a separate selection of text proximate to each of the one or more signature elements, each separate selection of text comprising context for a particular signature element proximate to the selection of text;

identifying, by the computer system, for each of the one or more signature elements and context, one or more selected signatory records from among a plurality of signatory records, wherein each of the one or more selected signatory records match a particular signature element and context from among the one or more signature elements and context; and determining, by the computer system, for each of the one or more signature elements and context, a separate predicted role from among a plurality of roles from the one or more selected signatory records.

13. The computer system according to claim 12, wherein the computer code further includes instructions for causing the processor(s) set to perform the following operation(s):

accessing, by the computer system, the plurality of signatory records, each signatory record specifying one or more of a signatory company type, a signatory name, a signature sample, dates of employment and one or more roles.

14. The computer system according to claim 12, wherein identifying, by the computer system, for each of the one or more signature elements and context, one or more selected signatory records from among a plurality of signatory records, wherein each of the one or more selected signatory records match a particular signature element and context from among the one or more signature elements and context further comprises:
- comparing, by the computer system, a particular signature element of the one or more signature elements with a separate signature sample in each of the plurality of signatory records; and
- identifying, by the computer system, the one or more selected signatory records from among the plurality of signatory records comprising the separate signature sample matching the particular signature element.

15. The computer system according to claim 14, wherein the computer code further includes instructions for causing the processor(s) set to perform the following operation(s):
- identifying, by the computer system, a date from the context associated with a particular signature element from among the one or more signature elements; and
- removing, by the computer system, any of the one or more selected signatory records comprising a range of employment dates that do not include the date.

\* \* \* \* \*